(12) United States Patent
Nakagawa

(10) Patent No.: US 12,147,762 B2
(45) Date of Patent: Nov. 19, 2024

(54) CHARACTER INPUT DEVICE, CHARACTER INPUT METHOD, AND COMPUTER-READABLE STORAGE MEDIUM STORING A CHARACTER INPUT PROGRAM

(71) Applicant: OMRON Corporation, Kyoto (JP)

(72) Inventor: Atsuhiro Nakagawa, Muko (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/174,314

(22) Filed: Feb. 24, 2023

(65) Prior Publication Data

US 2024/0020470 A1 Jan. 18, 2024

(51) Int. Cl.
*G06F 40/242* (2020.01)
*G06F 40/166* (2020.01)

(52) U.S. Cl.
CPC .......... *G06F 40/242* (2020.01); *G06F 40/166* (2020.01)

(58) Field of Classification Search
None
See application file for complete search history.

(56) References Cited

U.S. PATENT DOCUMENTS

| | | |
|---|---|---|
| 2005/0169527 A1 | 8/2005 | Longe et al. |
| 2006/0274051 A1 | 12/2006 | Longe et al. |
| 2009/0284471 A1 | 11/2009 | Longe et al. |
| 2010/0257478 A1 | 10/2010 | Longe et al. |
| 2011/0234524 A1 | 9/2011 | Longe et al. |
| 2014/0052437 A1 | 2/2014 | Longe et al. |
| 2014/0115538 A1 | 4/2014 | Kim et al. |

FOREIGN PATENT DOCUMENTS

| | | | |
|---|---|---|---|
| EP | 0732646 A2 | * | 9/1996 |
| EP | 1700291 A2 | | 9/2006 |
| EP | 2722731 A1 | | 4/2014 |

(Continued)

OTHER PUBLICATIONS

JP S63168560 U translation, 6 pages, Nov. 1988. (Year: 1988).*

(Continued)

*Primary Examiner* — Amelia L Tapp
(74) *Attorney, Agent, or Firm* — METROLEX IP LAW GROUP, PLLC; Robert L. Scott, Esq.

(57) ABSTRACT

The character input device includes a character input section, a candidate obtainment unit, a finalization unit, and a registration unit. A character string is input to the character input section. The candidate obtainment unit obtains a candidate character string registered in the dictionary and corresponding to the character string that has been received by the character input section. The finalization unit finalizes the candidate character string obtained by the candidate obtainment unit and selected, as a finalized character string for the character string that has been received by the character input section. If a part of the finalized character string finalized by the finalization unit is deleted, the registration unit registers, in the dictionary, the remaining character string that remains without being deleted, in association with the character string that has been received by the character input section.

8 Claims, 10 Drawing Sheets

(56) References Cited

FOREIGN PATENT DOCUMENTS

JP          S63168560    * 11/1988
JP          2002-41509 A    2/2002

OTHER PUBLICATIONS

Lv et al., âLearning-Based Candidate Segmentation Scoring for Real-Time Recognition of Online Overlaid Chinese Handwritingâ 2013 12th International Conference on Document Analysis and Recognition, pp. 74-78. (Year: 2013).*
The extended European search report (EESR) issued on Jul. 12, 2023 in a counterpart European patent application.

* cited by examiner

CHARACTER INPUT DEVICE, CHARACTER INPUT METHOD, AND COMPUTER-READABLE STORAGE MEDIUM STORING A CHARACTER INPUT PROGRAM

CROSS-REFERENCES TO RELATED APPLICATIONS

This application claims priority to Japanese Patent Application No. 2022-034330 filed Mar. 7, 2022, the entire contents of which are incorporated herein by reference.

BACKGROUND

The disclosure relates to a technique for supporting character input.

Various methods have been devised for a user to input Japanese characters using a software keyboard installed in an electronic device such as a smartphone. JP 200241509A discloses a technique for extracting an input character (or input characters) and conversion candidates for the input character (or the input characters), for example. The input character(s) and the conversion candidates are associated with each other and stored in a conversion learning database. When the user inputs character(s), the conversion learning database is referred to, and conversion candidates are read out.

JP 200241509A is an example of background art.

However, when a word is registered in the conversion learning dictionary database using the configuration disclosed in JP 200241509A, a plurality of procedures are required. When a user registers a person's name, a desired character string may not be registered for a reading that has been input by the user, for example. In this case, the user obtains a desired character string by inputting the person's name in short segments.

In such a case where it is difficult to obtain a desired character string for the reading that has been input by the user, the user uses a tool for creating a conversion learning dictionary database (hereinafter referred to as a dictionary tool). Next, the user needs to store, in the dictionary tool, the reading for the desired character string and the character string corresponding to the reading in association with each other.

Because it may be troublesome for the user to execute these processes, the user often does not use the dictionary tool. When the user does not use the dictionary tool, it may be necessary for the user to repeatedly perform an operation of converting a character string obtained by dividing a larger character string into short segments. Therefore, the configuration disclosed in JP 200241509A may be inconvenient for the user.

One or more embodiments is to provide a function by which a character input device may easily learn characters along the flow of character input performed by a user.

SUMMARY

A character input device according to one or more embodiments may be configured as follows.

The character input device in one or more embodiments may include a character input section, a candidate obtainment unit, a finalization unit, and a registration unit. A character string is input to the character input section. The candidate obtainment unit obtains a candidate character string registered in the dictionary and corresponding to the character string input to the character input section. The finalization unit finalizes the candidate character string obtained by the candidate obtainment unit and selected by the user, as a finalized character string for the character string that has been received by the character input section. If a part of the finalized character string finalized by the finalization unit is deleted, the registration unit registers, in the dictionary, the remaining character string that remains without being deleted, in association with the character string that has been received by the character input section.

In above-described configuration, the user may cause the character input device to learn a desired character along the flow of normal character input processing such as character input and character deletion.

If a part of the finalized character string finalized by the finalization unit is deleted, the registration unit of the character input device may register, in the dictionary, a character string finalized by the finalization unit as a candidate character string that follows the remaining character string that has been received by the character input section.

The registration unit of the character input device may register, in the dictionary, the character string input to the character input section and a character string that is composed of the remaining character string obtained by deleting a part of the finalized character string finalized by the finalization unit for the character string input to the character input section and the candidate character string that is registered in the dictionary and follows the remaining character string, in association with each other.

The character input device may further include a counting unit. The counting unit may count, for a combination of the character string that has been received by the character input section, the remaining character string obtained by deleting a part of the finalized character string finalized by the finalization unit for the character string that has been received by the character input unit, and the candidate character string that is registered in the dictionary and follows the remaining character string, the number of times of that combination. For a combination in which the number of occurrences of deletion counted by the counting unit is a predetermined number of times or more, the registration unit may register, in the dictionary, the character string that has been received by the character input section, and a character string that is composed of the remaining character string obtained by deleting a part of the finalized character string finalized by the finalization unit for the character string input to the character input section and the candidate character string that is registered in the dictionary and follows the remaining character string, in association with each other.

If the remaining character string is not composed of one character, the registration unit of the character input device may prohibit a process of registering the remaining character string in the dictionary.

A character input device according to one or more embodiments may provide easy character learning environment along the flow of character input.

DETAILED DESCRIPTION

Hereinafter, one or more embodiments will be described with reference to the drawings.

1. Application Example

Figure 1:
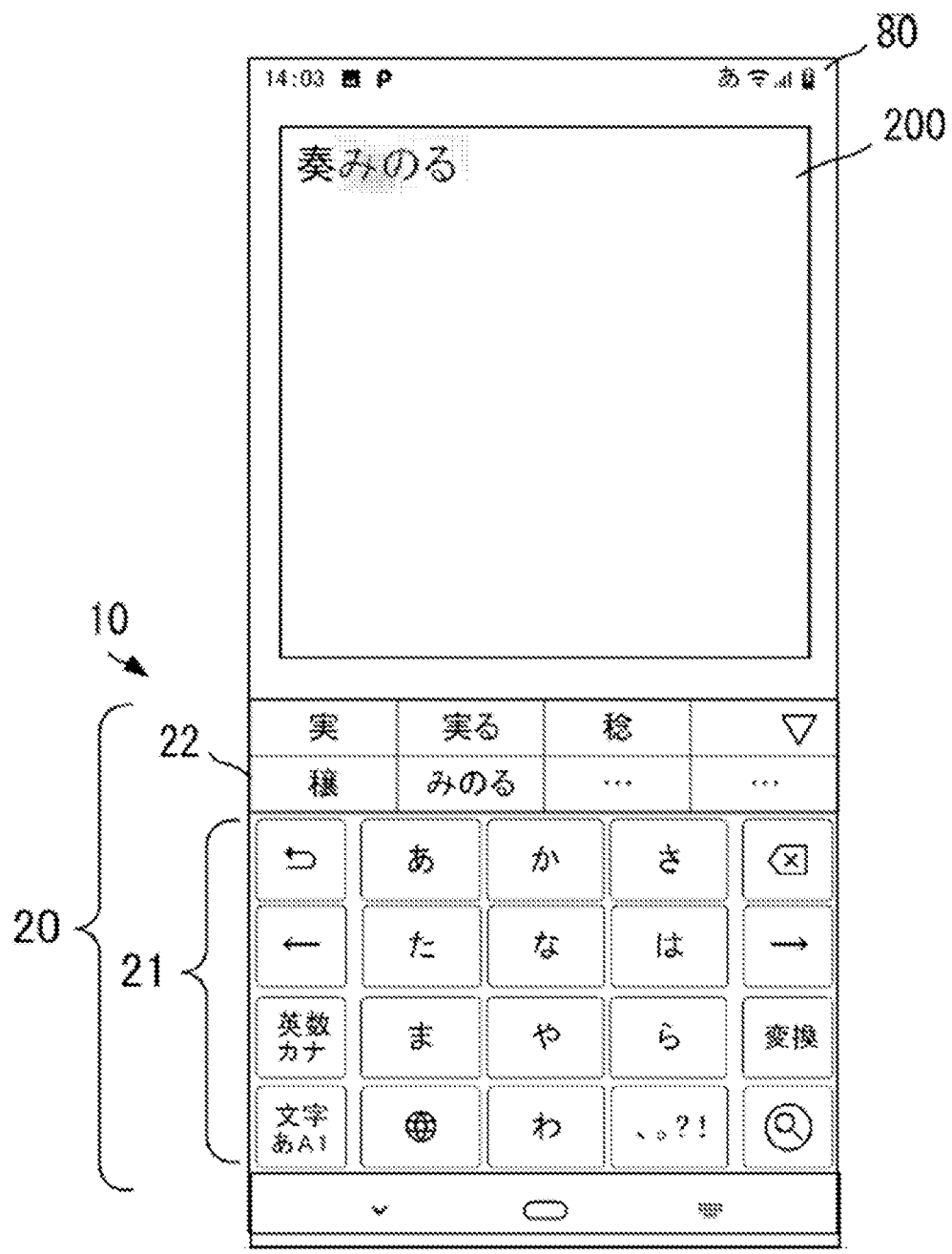
FIG. 1 is a diagram illustrating character input with a character input device according to an application example

FIG. 1 is a diagram illustrating how characters are input using a character input device 10. The user creates a mail using the character input device 10. When creating a mail, the user inputs characters to the mail application.

The character input device 10 is installed in an electronic device such as a smartphone, for example. Here, the electronic device is not limited to a smartphone, and may also be any device to which the user may input characters, such as a tablet or a personal computer.

Hereinafter, an example how the user inputs characters will be described in detail. A smartphone 80 includes a touch panel. The user activates an application installed in the smartphone 80.

The user activates a mail application, for example. The user inputs a character string in an input field 200. Although a mail application is used in the example, the application is not limited to a mail application as long as the application has a function for inputting characters.

The character input device 10 receives a result of the user operating the touch panel of the smartphone 80. The user activates a mail application and inputs characters to create a mail, for example. The character input device 10 detects an operation for starting Japanese character input performed by the user. The character input device 10 activates a display unit 20 (a character input section 21 and a candidate display section 22) by detecting the operation of the character input performed by the user.

As shown in FIG. 1, the user wants to input the character string " 奏実" (transcription: kana ( 奏 )-mi ( 実 ), which is an example of Japanese person's name) in the input field 200. First, the user inputs the character string " かなで る" (transcription: ka ( か )-na ( な )-de ( で )-ru ( る ) in the input field 200 through the character input section 21. The character input device 10 outputs " 奏でる" as a conversion candidate for " かなでる".

The user selects the candidate character string " 奏でる" for the input character string " かなでる", and finalizes the character string " 奏でる". Next, the user uses a delete button or the like and delete the character string " でる", which is a part of the character string that has been finalized. At this time, the character input device 10 stores, in the dictionary database 50, the character string " かなでる" and the character " 奏", which is a part of the character string " 奏でる", in association with each other.

Next, the user inputs the character string " みのる" (transcription: mi ( み )-no ( の )-ru ( る )) through the character input section 21. The character input device 10 outputs " 実" as a conversion candidate for " みのる".

By performing these operations, the user may finalize a desired character string " 奏実".

With above-described configuration, the user may register a desired character string in the dictionary database, along the flow of inputting characters and deleting unnecessary characters from the characters that the user has finalized. That is to say, the user may register, in the dictionary database, a desired character string in the dictionary database without intentionally registering the reading of the desired character string and a character string corresponding to the desired character string. Therefore, the user may efficiently input characters.

2. First Configuration Example

Figure 2:
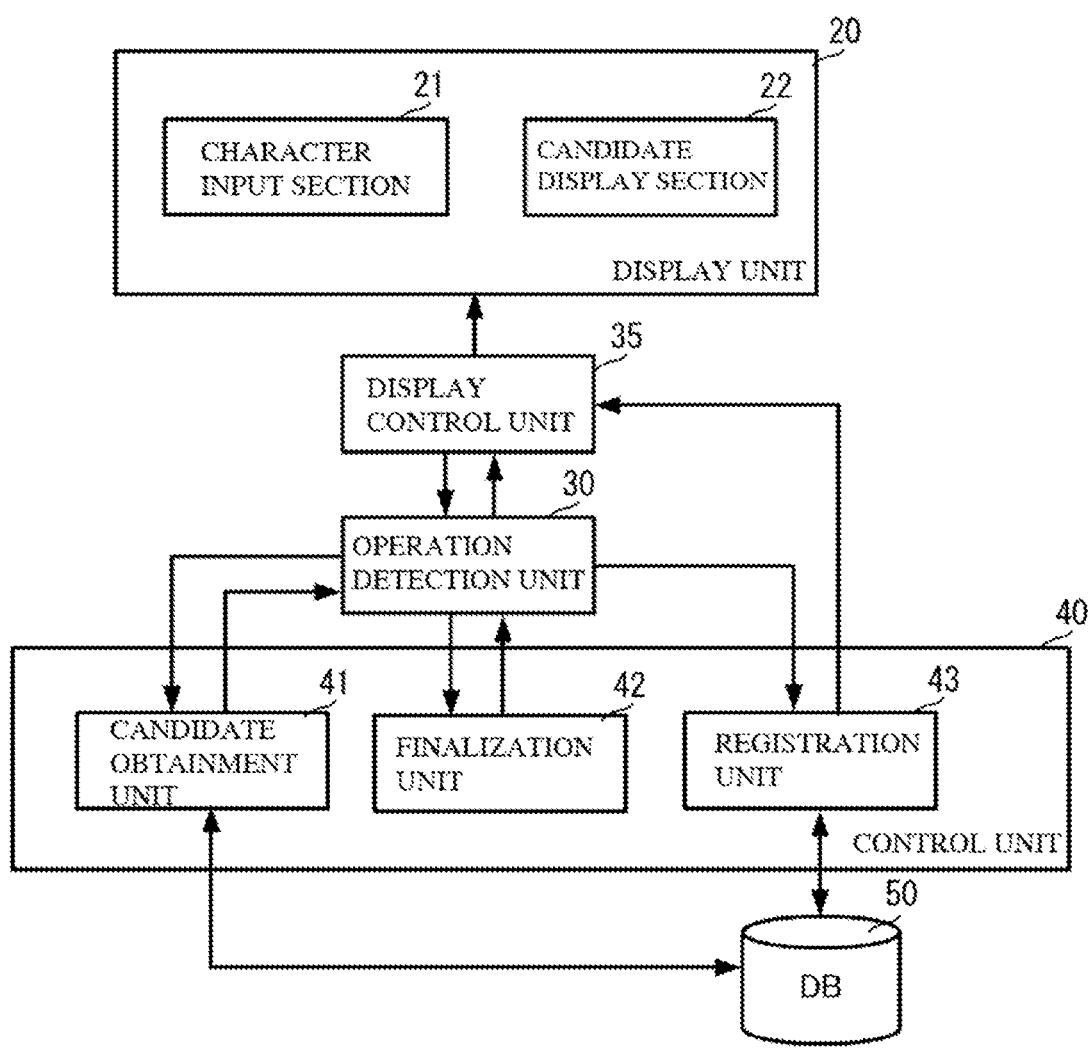
FIG. 2 is a block diagram illustrating a character input device having a configuration disclosed in a first configuration example.

FIG. 2 is a block diagram showing a character input device having the configuration disclosed in the first configuration example. FIGS. 3 (A) and 3 (B) are diagrams illustrating how characters are input through the character input device having the configuration disclosed in the first configuration example. FIGS. 4 (A) and 4 (B) are diagrams illustrating how characters are input through the character input device having the configuration disclosed in the first configuration example. The electronic device to which the character input device 10 is applied is not limited to a smartphone, but may be any electronic device that has a function for the user to input characters.

As shown in FIG. 2, the character input device 10 includes a display unit 20, an operation detection unit 30, a display control unit 35, a control unit 40, and a dictionary database 50.

As described above, the display unit 20 includes the character input section 21 and the candidate display section 22. As shown in FIG. 1, the character input section 21 and the candidate display section 22 are arranged on the screen of a smartphone 80, for example. Various keys for inputting characters are displayed in the character input section 21. Conversion candidates that have been obtained thorough a method described later and conversion candidates that have been narrowed down are displayed in the candidate display section 22. The character input section 21 is a software keyboard, for example.

The smartphone 80 includes a touch panel. The touch panel detects operations performed by a user. More specifically, the touch panel detects operations on the input field 200 of the mail application, and the character input section 21 and the candidate display section 22 provided in the display unit 20. The detection of the operation includes, for example, an operation position, a time length during which the operation is performed, a temporal change in the operation position, and the like. The result of the detection of the operation is output to the operation detection unit 30. The operation detection unit 30 outputs the detection result to the display control unit 35 and the control unit 40, depending on the result of the detection of the operation performed by the user through the touch panel. The display control unit 35 outputs, to the display unit 20, a display corresponding to the result of the operation performed by the user.

The control unit 40 includes a candidate obtainment unit 41, a finalization unit 42, and a registration unit 43. The control unit 40 and the display controller 35 may include one or more hardware CPU (a processor or processors), a memory or memories, and other electronic circuits. When executing the character input program according to one or more embodiments, the hardware CPU or CPUs e.g. when configured by a character input program, performs operations as the candidate obtainment unit 41, the finalization unit 42, and the registration unit 43. The operations as the operation detection unit 30, the display control unit 35, may additionally be performed, such as under control of the control unit 49 or independently, by execution of the character input program, or may operate as independent circuits. The memory or memories have an area for deploying the character input program according to one or more embodiments and an area for temporarily storing data generated when the character input program is executed. The control unit 40 may also be an LSI or LSIs in which the hardware CPU or CPUs, the memory or memories, and the like are integrated. Also, the hardware CPU or CPUs may be a computer for executing the character input method according to one or more embodiments.

The candidate obtainment unit 41 searches the dictionary database 50, and obtains a plurality of conversion candidates that match the reading of the character string input by the user. At this time, the candidate obtainment unit 41 obtains the plurality of conversion candidates also in association with the priority of the conversion candidates that have been arranged in a normal manner. The priority of the conversion candidates that have been arranged in a normal manner is set based on the use history of the user and the general use frequency, and may be set by various known methods. The candidate obtainment unit 41 outputs the plurality of conversion candidates to the candidate display section 22, depending on the priority of the conversion candidates that have been arranged in a normal manner.

The finalization unit 42 finalizes, as a finalized character string, a candidate character string selected by the user from the candidate character strings displayed on the candidate display section 22.

The registration unit 43 associates the character string input by the user through the character input section 21 with a remaining character string obtained by deleting a part of the character string, and stores the character string and the remaining character string in the dictionary database 50. Details thereof will be described later.

The dictionary database 50 stores the reading of the character string input by the user, conversion candidates for the reading, display priorities of the conversion candidates in normal conversion processing, and the like.

As a more specific example, a procedure in which the user inputs characters will be described with reference to FIGS. 2, 3(A), 3(B), 4(A), and 4(B). The user operates the character input section 21 in order to input the character string "奏実". "奏実" is a Japanese person's name, for example, and its reading is "かなみ".

Conventionally, when inputting the character string "奏実" for the reading "かなみ", it is assumed that user performs the following procedure. In one or more embodiments, character input is performed in the same procedure as described below.

Figure 3A:
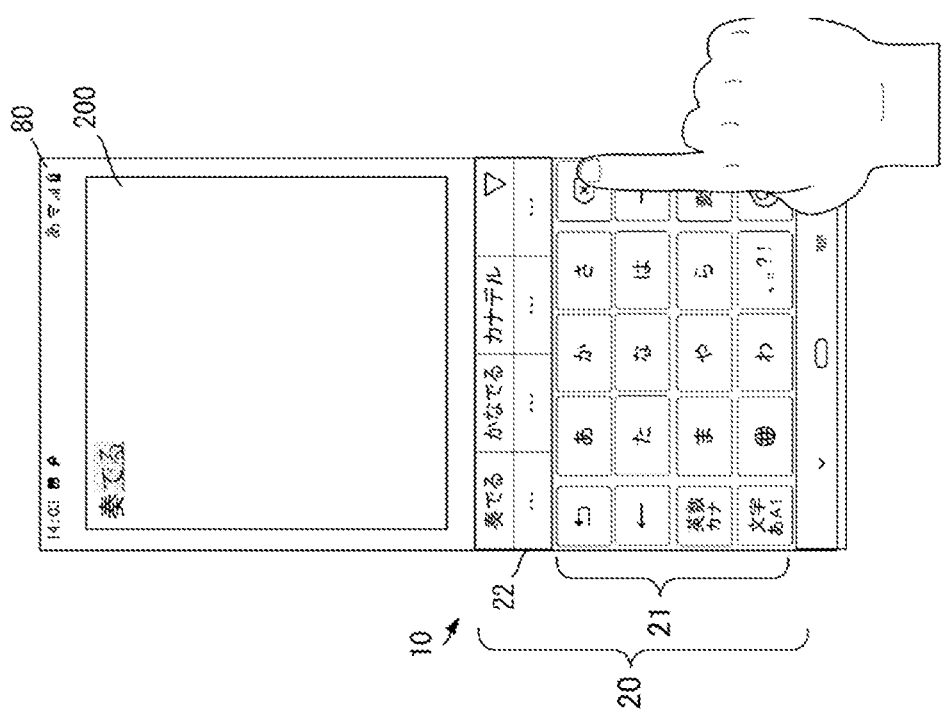
FIGS. 3A and 3B are diagrams illustrating character input with a character input device having a configuration disclosed in a first configuration example.
Figure 3B:
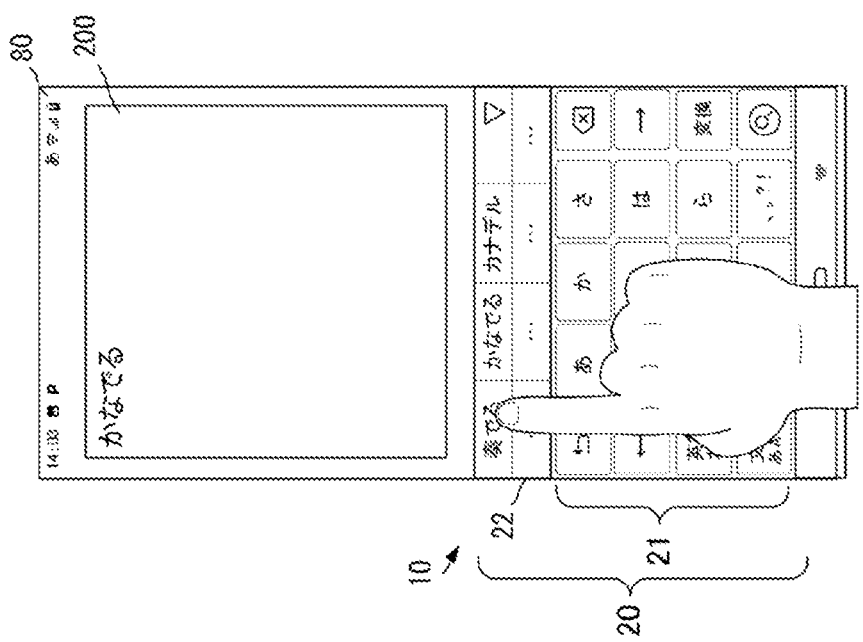

As shown in FIG. 3(A), the user inputs a character string "かなでる" (or "かな　で") through the character input section 21. The candidate obtainment unit 41 searches the dictionary database 50, and obtains conversion candidates for the character string "かなでる". The reading character string "かなでる" corresponds to a character string input by the user according to one or more embodiments. At this time, as shown in FIG. 3(B), the character input device 10 displays the conversion candidates "奏でる", "かなでる", "カナデル", and the like in the candidate display section 22. Furthermore, the candidate obtainment unit 41 outputs the reading character string "かなでる" to the registration unit 43.

Next, as shown in FIG. 3(B), the user selects the character string "奏でる" displayed in the candidate display section 22.

As a result, the operation detection unit 30 detects that the character string "奏でる" selected by the user, and outputs the character string "奏でる" to the finalization unit 42. The finalization unit 42 outputs the character string "奏でる" to the display control unit 35 as a finalized character string. Then, the display control unit 35 displays the finalized character string "奏でる" in the input field 200.

Next, the user deletes the character string "でる", which is a part of the finalized character string "奏でる" displayed in the input field 200. More specifically, the user taps the delete button arranged in the character input section 21. At this time, the operation detection unit 30 detects that "でる" has been deleted, which is a part of the finalized character string "奏でる". The character "奏" is the remaining character obtained by deleting "でる" from the finalized character string "奏でる".

The operation detection unit 30 outputs the remaining character "奏" to the registration unit 43. The registration unit 43 stores, in the dictionary database 50, the read character string "かなでる" and the remaining character "奏" in association with each other.

Figure 4A:
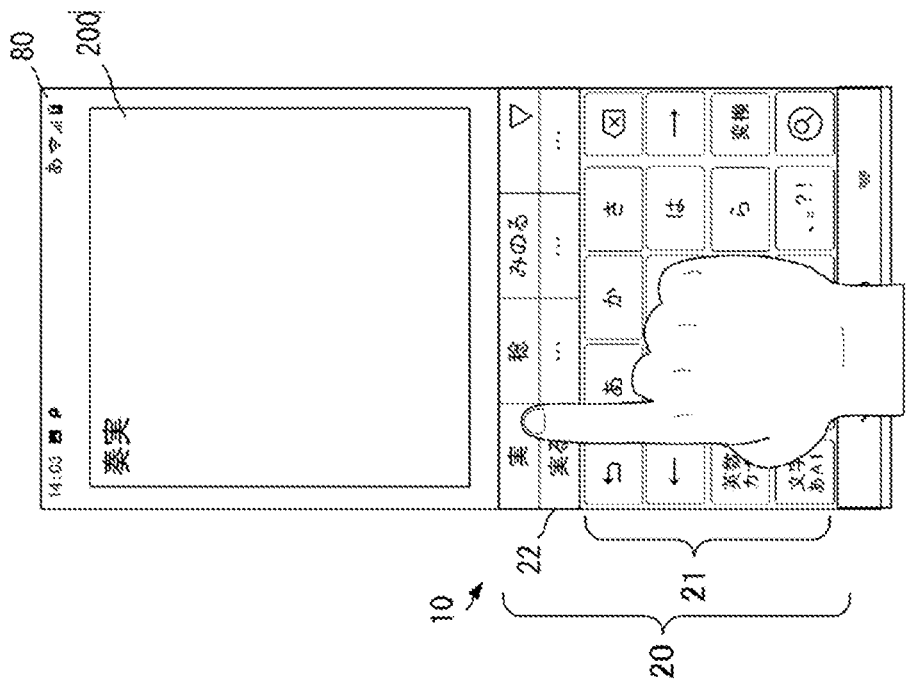
FIGS. 4A and 4B are diagrams illustrating character input with a character input device having a configuration disclosed in a first configuration example.

Next, the user inputs a character string "みのる" through the character input section 21. Thereafter, the candidate obtainment unit 41 searches the dictionary database 50, and obtains conversion candidates for the character string "みのる". At this time, as shown in FIG. 4(A), the character input device 10 displays the conversion candidates "実", "稔" (also the character has the reading "mi-no-ru" in Japanese), "みのる", and the like in the candidate display section 22. Then, the user selects the character "実" displayed in the candidate display section 22.

Figure 4B:
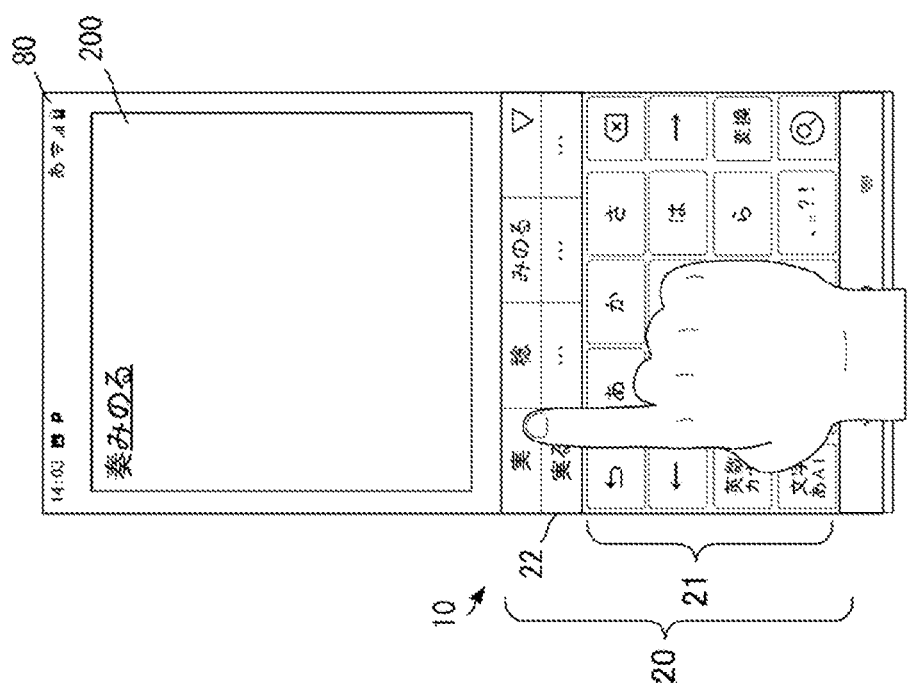

As shown in FIG. 4(B), the character input device 10 outputs the character "実" to the input field 200. Accordingly, the user may obtain the desired character string "奏実".

In the above procedure, the operation detection unit 30 detects an operation of deleting "でる", which is a part of the finalized character string "奏でる". In response to the operation, the registration unit 43 stores the reading character string "かなでる" and the remaining characters "奏" in association with each other. Accordingly, the character input device 10 may easily learn characters without the user intentionally performing dictionary registration. In other words, the user may register a desired character string in the dictionary along the flow of normal character input. Therefore, the user may efficiently input characters.

3. Operation Example

Figure 5:
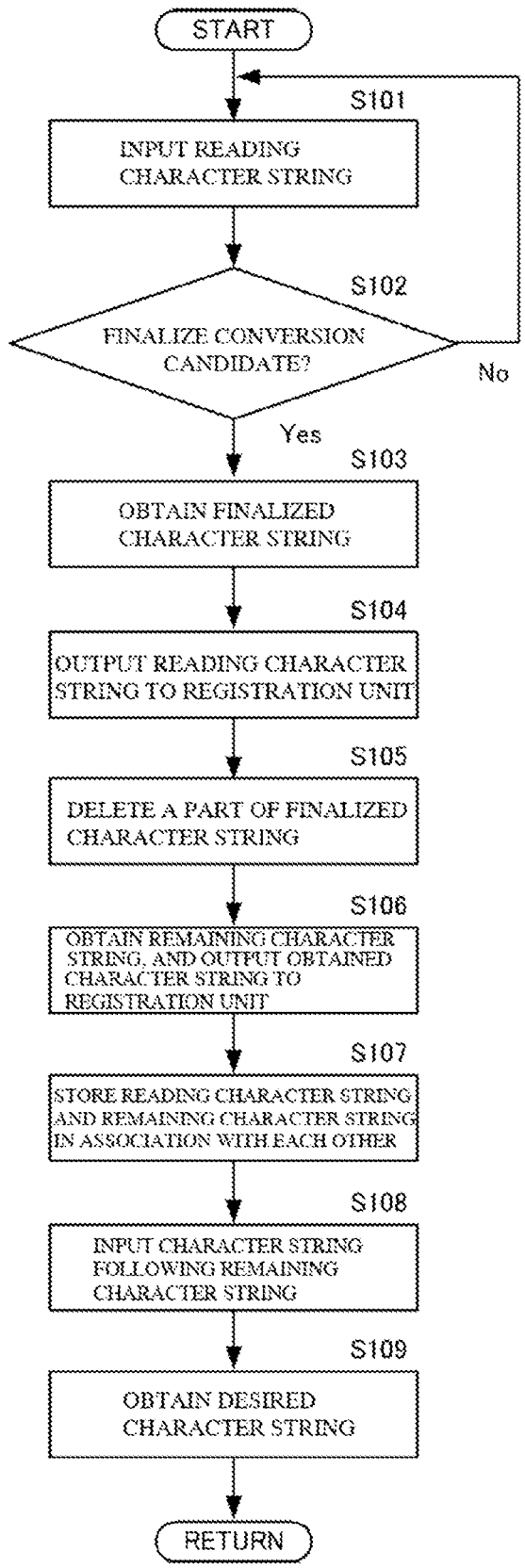
FIG. 5 is a flowchart illustrating a flow of processing executed by a character input device that operates according to an operation example.

FIG. 5 is a flowchart showing a flow of processing executed by the character input device 10 in the operation example. The processing flow of the character input device 10 will be described with reference to FIGS. 1, 2, 3(A), 3(B), 4(A), 4(B), and 5.

As shown in FIG. 3(A), the user inputs a reading character string "かなでる" through the character input section 21 (step S101). The candidate obtainment unit 41 searches the dictionary database 50, and obtains conversion candidates for the reading character string "かなでる". At this time, as shown in FIG. 3(B), the character input device 10 displays the candidate character strings "奏でる", "かなで る", "カナデル", and the like for the reading character string "かなでる" in the candidate display section 22.

The character input device 10 determines whether or not the character string "奏でる" has been finalized (step S102). If the character input device 10 determines that the character string "奏でる" has been finalized (YES in step S102), the finalization unit 42 outputs the character string "奏でる" to the input field 200 as the finalized character string (step S103).

After the character string "奏でる" has been finalized as the finalized character string, the candidate obtainment unit 41 outputs the reading character string "かなでる" to the registration unit 43 (step S104).

Next, the user deletes the character string "でる", which is a part of the finalized character string "奏でる" displayed in the input field 200 (step S105). More specifically, the user taps the delete button arranged in the character input section 21. At this time, the operation detection unit 30 detects that "でる" has been deleted, which is a part of the finalized character string "奏でる". As a result, "奏" is obtained as the remaining character.

In response to the operation detection unit 30 detecting that "でる" has been deleted, which is a part of the finalized character string "奏でる", the remaining character "奏" is output to the registration unit 43 (step S106).

The registration unit 43 stores, in the dictionary database 50, the read character string "かなでる" and the remaining character "奏" in association with each other (step S107).

Next, the user inputs a character string "みのる" through the character input section 21 (step S108). Thereafter, the candidate obtainment unit 41 searches the dictionary database 50, and obtains conversion candidates for the character string "みのる". At this time, as shown in FIG. 4(A), the character input device 10 displays the conversion candidates "実", "稔", "みのる", and the like in the candidate display section 22.

The user selects the character "実" displayed in the candidate display section 22 (step S109). As shown in FIG. 4(B), the character input device 10 outputs the character "実" to e input field 200. Accordingly, the user may obtain a desired character string "奏実".

If the character input device 10 determines that the character string "奏でる" has not been finalized (No in step S102) by the user, the character input device 10 executes step S101 again.

Therefore, the character input device 10 may easily learn characters without the user intentionally performing dictionary registration. In other words, the user may register a desired character string in the dictionary along the flow of normal character input. Therefore, the user may efficiently input characters.

In the example described above, the reading character string is "かなでる". However, the reading character string may not be "かなでる", but may also be a character or characters such as "か", "かな", or "かなで" for the user to obtain the predicted conversions to obtain the candidate character strings. The registration unit 43 may also store the finalized character string "奏" in association with the reading character "か", for example.

4. First Modification Example

Next, a character input device according to a first modification example will be described with reference to the drawings. In the first configuration example, the character input device 10 executes processing in the order of Step S107 and Step S108. In contrast, in the first modification example, the character input device performs processing in the order of Step S108 and Step S107. Because the other features are the same as those of the character input device 10, the description thereof will be omitted.

Figure 6:
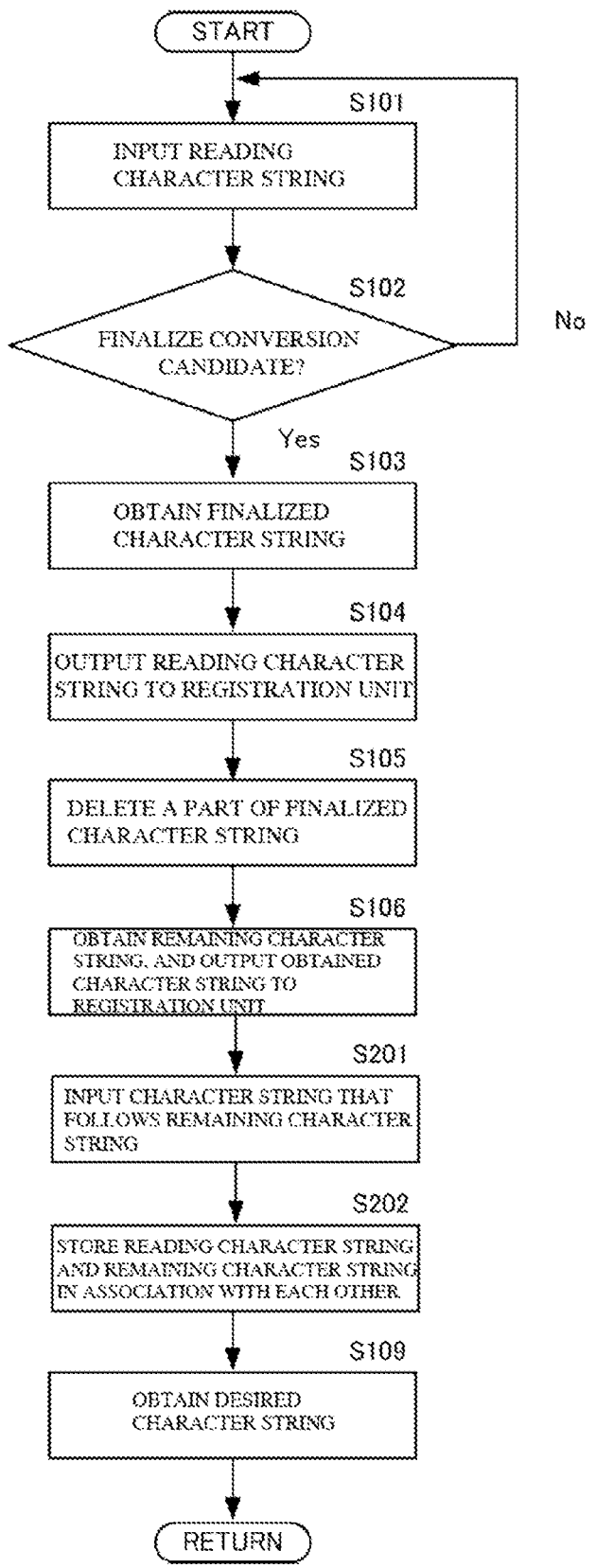
FIG. 6 is a flowchart illustrating a flow of processing executed by a character input device according to one or more embodiments in a first modification.

FIG. 6 is a flowchart showing a flow of processing executed by a character input device 10 according to the first modification example. The step S108 in the first configuration example corresponds to the step S201 in the first modification example, and the step S107 in the first configuration example corresponds to the step S202 in the first modification example.

In the first configuration example, in step S106, the operation detection unit 30 detects that "でる" has been deleted, which is a part of the finalized character string "奏でる", and then the remaining character "奏" is output to the registration unit 43. Next, the user inputs a reading character string "みのる" through the character input section 21 (step S201).

The operation detection unit 30 detects that the character string "みのる" has been input. As a result, the registration unit 43 stores, in the dictionary database 50, the reading character string "かなでる" and the remaining character "奏" in association with each other (step S202).

The user selects the character "実" displayed in the candidate display section 22 (step S109). The character input device 10 outputs the character "実" to the input field 200. Accordingly, the user may obtain a desired character string "奏 実".

With above-described configuration, the character input device 10A may clearly recognize that the user wants to associate the remaining character "奏" with the character "実". Accordingly, it may be possible to prevent the second character and the third character from being erroneously associated with each other, due to an operation error or the like by the user. In other words, an increase in the amount of data registered in the dictionary database 50 may be prevented.

5. Second Modification Example

Next, a character input device according to a second modification example will be described with reference to the drawings. A character input device 10B according to the second modification example is different from the character input device 10 according to the first configuration example in that a control unit 40B of the character input device 10B includes a counting unit 44. Because the other features are the same as those of the character input device 10, the description thereof will be omitted.

Figure 7:
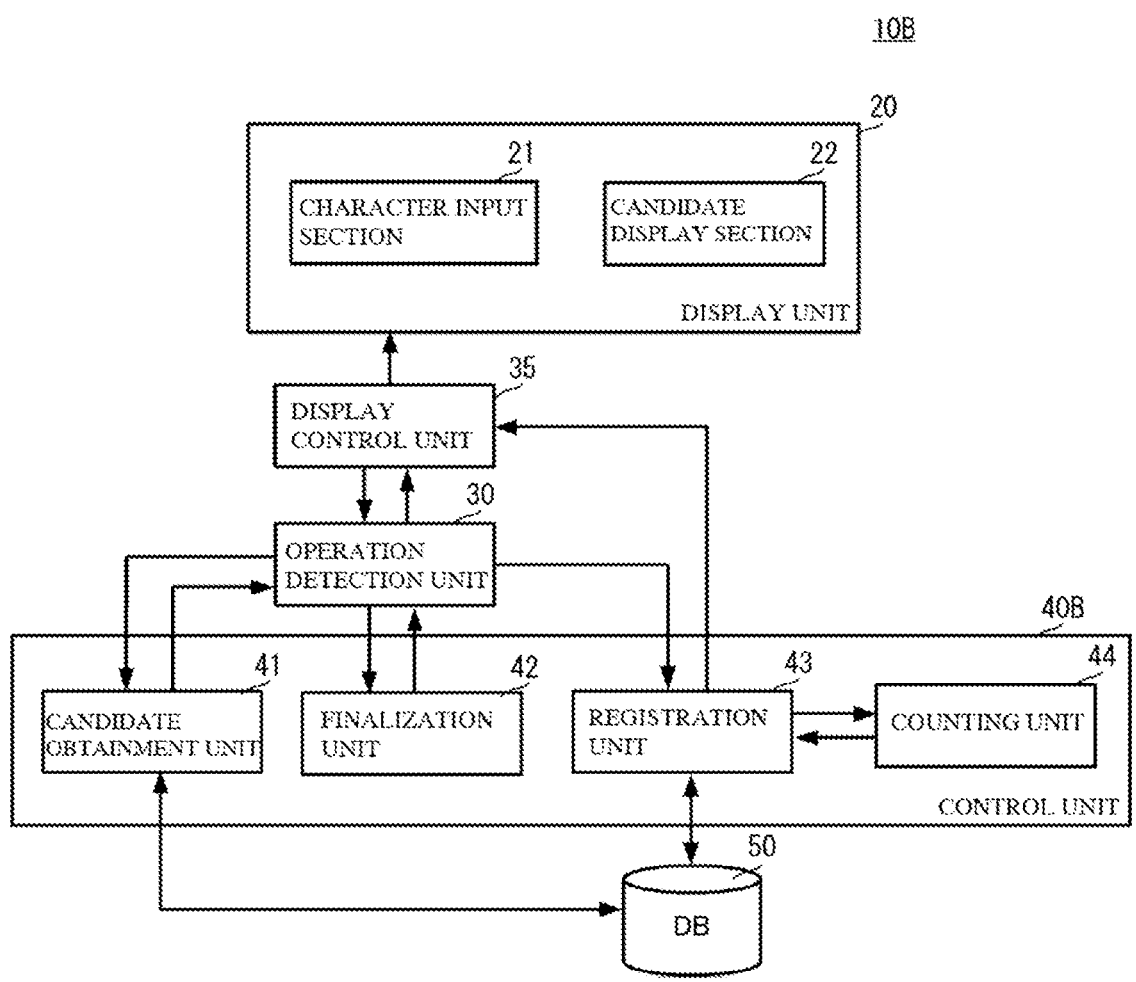
FIG. 7 is a block diagram illustrating a configuration of a character input device according to one or more embodiments in a second modification.
Figure 8:
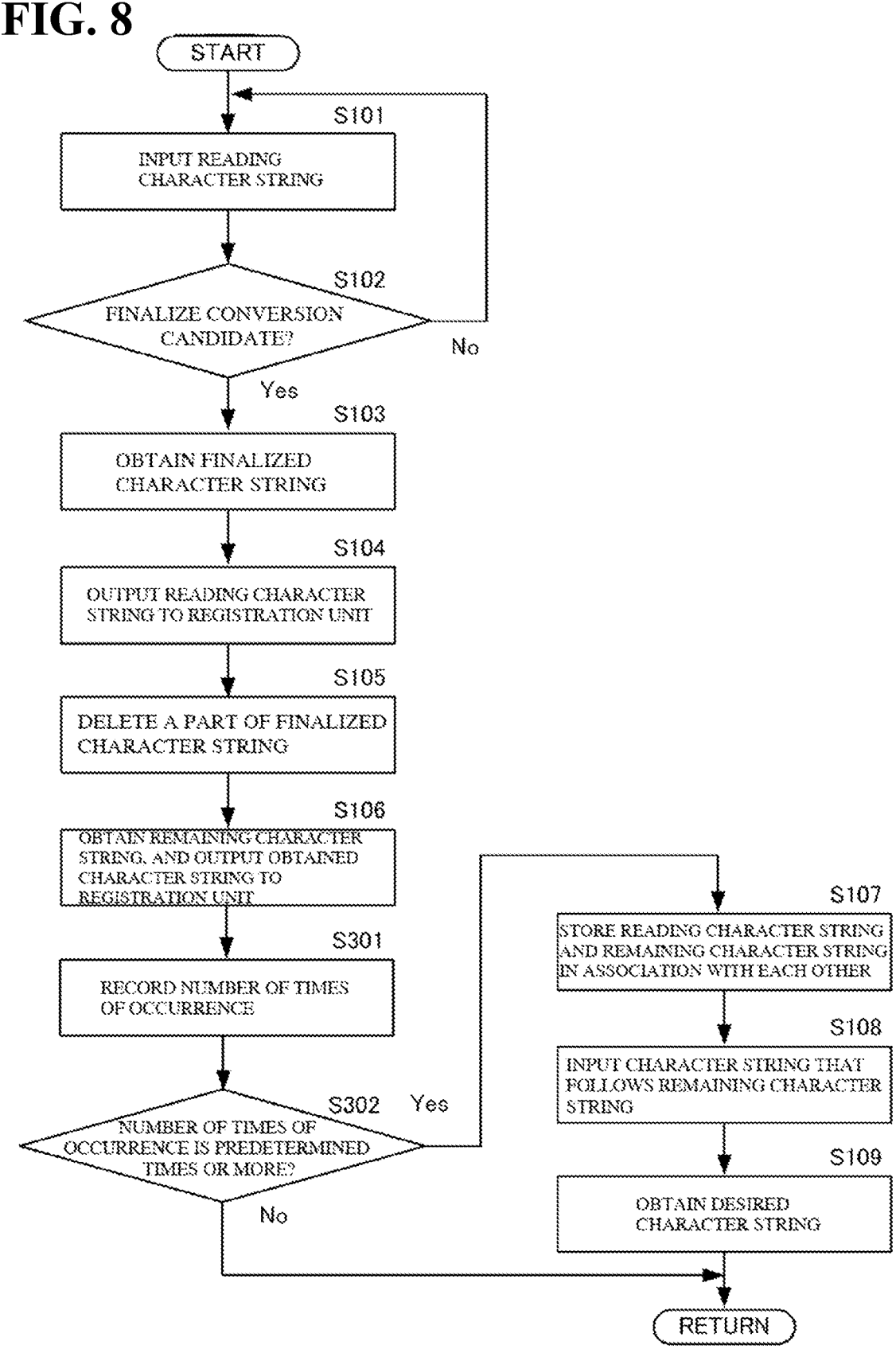
FIG. 8 is a flowchart illustrating a flow of processing executed by a character input device according to one or more embodiments in a second modification.

FIG. 7 is a block diagram showing a configuration of a character input device according to the second modification example. FIG. 8 is a flowchart showing a flow of processing executed by the character input device according to the second modification example.

The control unit 40B includes the candidate obtainment unit 41, the finalization unit 42, the registration unit 43, and the counting unit 44. The counting unit 44 counts and records the number of times (hereinafter referred to as the number of times of occurrence) a combination of a reading character string and a remaining character string that has been obtained by the user deleting a part of the finalized character string has been created. In other words, the counting unit 44 counts and records the number of times a part of the finalized character string obtained based on the reading character string has been deleted.

The counting unit 44 records the number of times of occurrence of deletion, and determines whether the number of times of occurrence is a predetermined number of times or more. If it is determined that the number of times of occurrence of deletion is the predetermined number of times (for example, three times) or more, the counting unit 44 outputs the determination result to the registration unit 43.

In accordance with the result, the registration unit 43 associates the reading character string with the remaining character string, and stores, in the dictionary database 50, the reading character string and the remaining character string in association with each other.

Next, a flow of processing executed by the character input device 10B according to the second modification example will be described with reference to FIG. 8. Here, because the processing from step S101 to step S106 is the same as that in the first configuration example, the description thereof will be omitted.

The counting unit 44 counts and records the number of times (the number of times of occurrence) a combination of a reading character string and a remaining character string that has been obtained by the user deleting a part of a finalized character string has been created (step S301).

The counting unit 44 determines whether the number of times of occurrence is a predetermined number of times or more (step S302). The predetermined number of times is three times, for example.

If it is determined that the number of times of occurrence is three times or more (YES in step S302), the counting unit 44 outputs the determination result to the registration unit 43. The registration unit 43 stores, in the dictionary database 50, the reading character string and the remaining character string in association with each other (step S107).

Next, the user inputs a character string through the character input section 21 (step S108). Thereafter, the candidate obtainment unit 41 searches the dictionary database 50, and obtains conversion candidates for the character string that has been input by the user. Then, the character input device 10 displays the conversion candidates in a candidate display section 22.

The user selects one of the conversion candidates that are displayed in the candidate display section 22 (step S109). The character input device 10 outputs, to the input field 200, the conversion candidate that has been selected by the user.

In step S302, when the counting unit 44 determines that the number of times of occurrence three is times or less (NO in step S302), the counting unit 44 increments the number of times of occurrence by one and ends the processing.

That is to say, the character input device 10B may store the reading character string and the remaining character string in association with each other by the user repeating the process of deleting a part of the finalized character string. With above-described configuration, the character input device 10B may learn more as intended by user.

In the above example, the case where the number of times of occurrence is three times or more is described. However, the number of times of occurrence is not limited to three times, and may be set to any number of times.

Furthermore, the predetermined number of times set as a reference may also be a number of times in consideration of a history of an erroneous input or deletion of characters when the user inputs characters. In other words, when the number of times of deletion is large due to a habit of the user or the like, it may be determined, by increasing the predetermined number of times, whether the operation of deleting a part of the finalized character string by the user is an operation for generating an intended remaining character string. If it is determined that there is a tendency that the number of times of deletion at the time of character input is large, the predetermined number of times may be increased to five times, six times, or the like.

6. Third Modification Example

Next, a character input device according to a third modification example will be described with reference to the drawings. A character input device according to the third modification is different from the character input device 10 according to the first configuration example in that a candidate character string that follows the remaining character string is obtained by inputting a reading character string. Because the other features are the same as those of the character input device 10, the description thereof will be omitted.

Figure 9:
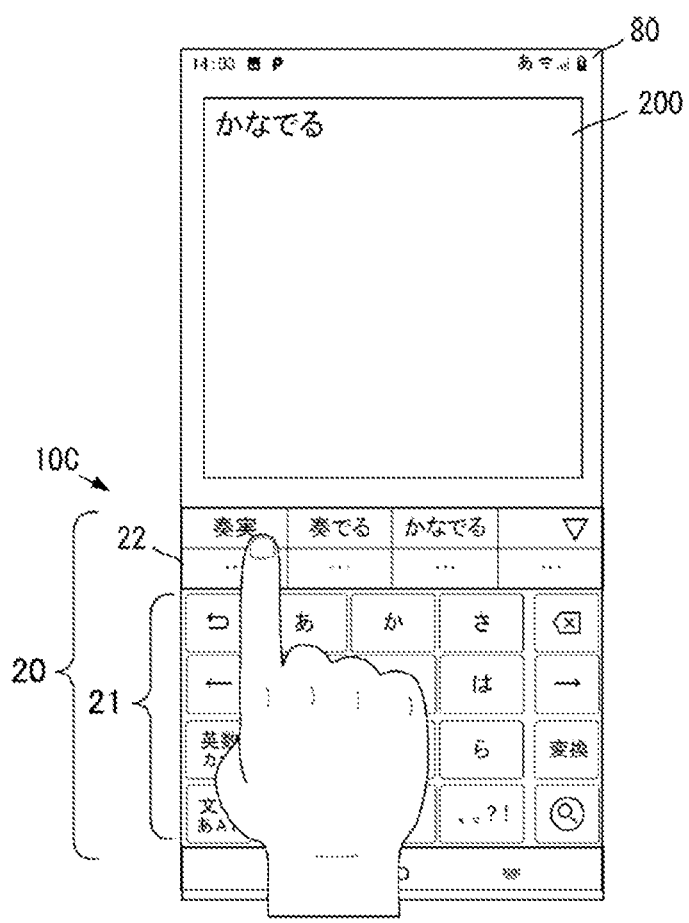
FIG. 9 is a diagram illustrating how characters are input using a character input device according to one or more embodiments in a third modification.
Figure 10:
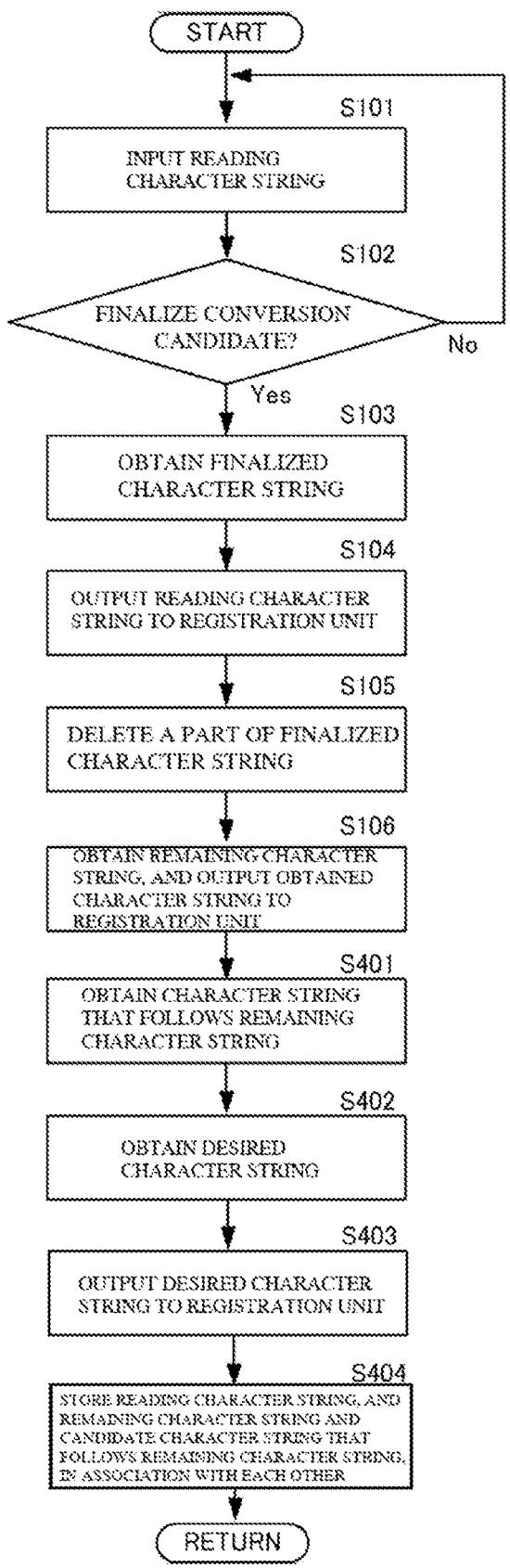
FIG. 10 is a flowchart illustrating a flow of processing executed by a character input device according to one or more embodiments in a third modification.

FIG. 9 is a diagram illustrating how characters are input through a character input device 10C according to the third modification example. FIG. 10 is a flowchart showing a flow of processing executed by the character input device 10C according to the third modification example.

As shown in FIG. 9, the user inputs a reading character string "かなでる" in the input field 200. As a result, the candidate obtainment unit 41 obtains the desired character string "奏実" (the remaining character and the candidate character that follows the remaining character) stored in the dictionary database 50 in association with the reading character string "かなでる". Therefore, the user may obtain the desired character string "奏実" by only inputting the reading character string "かなでる".

In order to obtain the desired character string "奏実" by only inputting the read character string "かなでる", a process of storing the reading character string, the remaining character string, and the character string that follows the remaining character string in the dictionary database 50 is executed using the character input device 10C, as shown in FIG. 10. Here, because the processing from step S101 to step S106 in FIG. 10 is the same as that in the configuration example 1, description thereof will be omitted.

The candidate obtainment unit 41 searches the dictionary database 50, and obtains a candidate character string that follows the remaining character "奏" (step S401). In this case, the character input device 10 displays the conversion candidates "実", "稔", "みのる", and the like in the candidate display section 22.

The user selects the character "実" displayed in the candidate display section 22 (step S402). The character input device 10 outputs the character "実" to the input field 200.

The operation detection unit 30 detects that the character "実" displayed in the candidate display section 22 has been selected by the user, and outputs the character "実" to the registration unit 43 (step S403).

The registration unit 43 stores the reading character string, and the remaining character string and the candidate character string that follows the remaining character string in association with each other in the dictionary database 50 (step S404).

As described above, the candidate obtainment unit 41 may obtain a candidate character string that follows the remaining character string. In this case, the candidate obtainment unit 41 obtains the character "実" as a candidate character that follows the remaining character "奏". Then, the user selects the character "実". As a result, the user may obtain the desired character string "奏実" by inputting the reading character string "かなでる".

Therefore, the character input device 10C may easily learn characters without the user intentionally performing dictionary registration. In other words, the user may register a desired character string in the dictionary along the flow of normal character input. Therefore, the user may efficiently input characters.

Furthermore, by inputting the reading character string, the user may easily obtain a desired character string in which the remaining character string and the character string that follows the remaining character string are combined.

7. Fourth Modification Example

Next, a character input device according to a fourth modification example will be described with reference to the drawings. A character input device according to the fourth modification example is different from the character input device 10 according to the first configuration example in that the registration unit counts the number of characters included in the remaining character string. Because the other features are the same as those of the character input device 10, the description thereof will be omitted.

The registration unit 43 counts the number of characters included in the remaining character string. If the remaining character string is composed of one character, the registration unit 43 registers the remaining character in the dictionary database 50. In contrast, if the remaining character string is composed of 0 characters or two or more characters, the registration unit 43 does not register the remaining character string in the dictionary database 50.

With above-described configuration, the dictionary database 50 may be updated more as intended by the user. More specifically, if it is determined that the remaining character string is composed of 0 characters, the registration unit 43 determines that the user's operation is an error and does not register the remaining character string in the dictionary database 50. Similarly, if it is determined that the remaining character string is composed of two or more characters, the registration unit 43 determines that the user's operation is an error and does not register the remaining character string in the dictionary database 50.

Also with above-described configuration, it may be possible to configure the dictionary database 50 according to the intention of the user, and the convenience of the user is improved.

One or more embodiments is not limited to the above-described examples, and may be embodied by modifying the constituent elements without departing from the gist in an implementation stage. In addition, various embodiments may be formed by appropriately combining a plurality of constituent elements disclosed in the above examples. Some components may also be deleted from all the components shown in the above examples, for example. Furthermore, constituent elements included in different examples may be appropriately combined.

The correspondence between the configuration according to one or more embodiments and the above configuration may be described as in the following supplementary note.

Supplementary Note

The character input device (10) according to one or more embodiments may include the character input section (21), the candidate obtainment unit (41), the finalization unit (42), and the registration unit (43). A character string that is input by a user is input to the character input section (21). The candidate obtainment unit obtains a candidate character string registered in the dictionary and corresponding to the character string input to the character input section (21). The finalization unit (42) finalizes the candidate character string obtained by the candidate obtainment unit (41) and selected by the user as a finalized character string for the character string input to the character input section. If a part of the finalized character string finalized by the finalization unit (42) is deleted, the registration unit (43) registers, in the dictionary, the remaining character string that has not been deleted, in association with the character string input to the character input section.

LIST OF REFERENCE NUMERALS

10, 10A, 10B, 10C: Character input device
20: Display unit
21: Character input section
22: Candidate display section
30: Operation detection unit
35: Display control unit
40, 40B: Control unit
41: Candidate obtainment unit
42: Finalization unit
43: Registration unit
44: Counting unit
50: Dictionary database
80: Smartphone
200: Input field

The invention claimed is:

1. A character input device comprising:
   a character input section that receives a character string; and
   a processor configured with a program to perform operations comprising:
      obtaining a candidate character string registered in a dictionary and corresponding to the character string that has been received by the character input section;
      finalizing the candidate character string as a finalized character string for the character string that has been received by the character input section; and
      registering a remaining character string in the dictionary in association with the character string that has been received by the character input section, in response to a part of the finalized character string being deleted, wherein
      the processor is configured with the program to perform operations
         such that registering the remaining character string comprises, in response to the part of the finalized character string being deleted, registering, in the dictionary, a finalized character string that is finalized and follows the remaining character string, as a candidate of a character string that follows the remaining character string that has been received by the character input section,
further comprising counting, for a combination of: the character string that has been received by the character input section; the remaining character string obtained by deleting a part of the finalized character string finalized by the finalization unit for the character string that has been received by the character input section; and the candidate character string that is registered in the dictionary and follows the remaining character string, a number of times of occurrence of the combination, and when the number of times of occurrence of the combination is a predetermined number of times or more, registering, in the dictionary, the character string that has been received by the character input section, the remaining character string obtained by deleting the part of the finalized character string, and the candidate character string that is registered in the dictionary, in association with each other.

2. The character input device according to claim 1, wherein the processor is configured with the program such that registering a remaining character string further comprises registering, in the dictionary, the character string that has been received by the character input section, and a character string that is composed of the remaining character string obtained by deleting a part of the finalized character string finalized for the character string that has been received by the character input section and the candidate character string that is registered in the dictionary and that follows the remaining character string, in association with each other.

3. The character input device according to claim 2, wherein, if the remaining character string is not composed of one character, the processor is configured with the program such that registering a remaining character string further comprises prohibiting registering the remaining character string in the dictionary.

4. The character input device according to claim 1, wherein, if the remaining character string is not composed of one character, the processor is configured with the program such that registering a remaining character string further comprises prohibiting registering the remaining character string in the dictionary.

5. A character input method executed by computer, comprising:
receiving a character string by a character input section of the computer;
obtaining a candidate character string registered in a dictionary and corresponding to the character string that has been received by the character input section;
finalizing a candidate character string selected from the obtained candidate character string, as a finalized character string for the character string that has been received by the character input section; and
if a part of the finalized character string is deleted, registering a remaining character string in the dictionary in association with the character string that has been received by the character input section, wherein
registering the remaining character string comprises, in response to the part of the finalized character string being deleted, registering, in the dictionary, a finalized character string that is finalized and that follows the remaining character string, as a candidate of a character string that follows the remaining character string that has been received by the character input section,
the method further comprises counting, for a combination of: the character string that has been received by the character input section; the remaining character string obtained by deleting a part of the finalized character string finalized by the finalization unit for the character string that has been received by the character input section; and the candidate character string that is registered in the dictionary and follows the remaining character string, a number of times of occurrence of the combination, and when the number of times of occurrence of the combination is a predetermined number of times or more, registering, in the dictionary, the character string that has been received by the character input section, the remaining character string obtained by deleting the part of the finalized character string, and the candidate character string that is registered in the dictionary, in association with each other.

6. The character input method according to claim 5, wherein, if the remaining character string is not composed of one character, registering a remaining character string further comprises prohibiting registering the remaining character string in the dictionary.

7. A non-transitory computer-readable storage medium storing a character input program, which when read and executed, causes a computer to perform operations comprising:
receiving a character string by a character input section;
obtaining a candidate character string registered in a dictionary and corresponding to the character string that has been received by the character input section;
finalizing a candidate character string selected from the candidate character string obtained in the obtaining the candidate character string, as a finalized character string for the character string that has been received by the character input section;
if a part of the finalized character string finalized is deleted, registering a remaining character string in the dictionary in association with the character string that has been received by the character input section, wherein
registering the remaining character string comprises, in response to the part of the finalized character string being deleted, registering, in the dictionary, a finalized character string that is finalized and that follows the remaining character string, as a candidate of a character string that follows the remaining character string that has been received by the character input section,
the operations further comprise counting, for a combination of: the character string that has been received by the character input section; the remaining character string obtained by deleting a part of the finalized character string finalized by the finalization unit for the character string that has been received by the character input section; and the candidate character string that is registered in the dictionary and follows the remaining character string, a number of times of occurrence of the combination, and when the number of times of occurrence of the combination is a predetermined number of times or more, registering, in the dictionary, the character string that has been received by the character input section, the remaining character string obtained by deleting the part of the finalized character string, and the candidate character string that is registered in the dictionary, in association with each other.

8. The non-transitory computer-readable storage medium according to claim 7, wherein, if the remaining character string is not composed of one character, registering a remaining character string further comprises prohibiting registering the remaining character string in the dictionary.

* * * * *

UNITED STATES PATENT AND TRADEMARK OFFICE
CERTIFICATE OF CORRECTION

| | | |
|---|---|---|
| PATENT NO. | : 12,147,762 B2 | Page 1 of 1 |
| APPLICATION NO. | : 18/174314 | |
| DATED | : November 19, 2024 | |
| INVENTOR(S) | : Atsuhiro Nakagawa | |

It is certified that error appears in the above-identified patent and that said Letters Patent is hereby corrected as shown below:

On the Title Page

Foreign Application Priority Data should be inserted as shown below:
--(30) Foreign Application Priority Data
March 7, 2022 (JP)................................... 2022-34330--

Signed and Sealed this
Thirty-first Day of December, 2024

Derrick Brent
*Acting Director of the United States Patent and Trademark Office*